United States Patent [19]
Cohen et al.

[11] Patent Number: 5,909,464
[45] Date of Patent: *Jun. 1, 1999

[54] SERIAL COMMUNICATIONS INTERFACE THAT SUPPORTS MULTIPLE INTERFACE STANDARDS

[75] Inventors: Gary L. Cohen, Sunnyvale; Scott Kingsley Smader, Cupertino, both of Calif.

[73] Assignee: Telebit Corporation, Cupertino, Calif.

[ * ] Notice: This patent is subject to a terminal disclaimer.

[21] Appl. No.: 08/901,907

[22] Filed: Jul. 29, 1997

Related U.S. Application Data

[63] Continuation of application No. 08/198,448, Feb. 18, 1994, Pat. No. 5,737,364.

[51] Int. Cl.$^6$ .............................. H04Q 11/04; H04B 1/38
[52] U.S. Cl. ........................... 375/220; 370/354; 333/25; 375/257
[58] Field of Search ..................................... 375/220, 219, 375/257, 377; 370/354, 351, 360, 438, 439, 443, 487, 537; 395/741, 500, 682; 364/810, 710.08; 333/24 R, 25, 19

[56] References Cited

U.S. PATENT DOCUMENTS

| | | | |
|---|---|---|---|
| 4,403,111 | 9/1983 | Kelly | 178/69 |
| 4,607,379 | 8/1986 | Marshall, Jr. | 375/121 |
| 4,628,308 | 12/1986 | Robert | 340/825.43 |
| 4,686,506 | 8/1987 | Farago | 340/347 |
| 4,964,124 | 10/1990 | Burnett | 371/15.1 |
| 5,025,412 | 6/1991 | Dalrymple | 364/900 |
| 5,056,058 | 10/1991 | Mirata | 364/900 |
| 5,165,022 | 11/1992 | Erhard et al. | 395/275 |
| 5,243,623 | 9/1993 | Murdock | 375/7 |
| 5,264,958 | 11/1993 | Johnson | 395/325 |

OTHER PUBLICATIONS

"Multi-Protocol Line Transceiver" *Sipex Corporation Product Catalog 1993*, pp. 63–82.
"Multi-Protocol Line Transceiver" *Sipex Corporation Product Catalog 1993*, pp. 87–90.

*Primary Examiner*—Edward L. Coles
*Assistant Examiner*—Madeleine AV Nguyen
*Attorney, Agent, or Firm*—Weingarten, Schurgin, Gagnebin & Hayes LLP

[57] ABSTRACT

An interface for connecting data-terminal-equipment (DTE) to a range of data-communication-equipment (DCE) using a multiplicity of interface standards is provided. The interface includes a DTE panel connector and a plurality of line drivers and receivers and associated electronics to select predetermined ones of the plurality of receivers and drivers for use by the DTE when cables having a predetermined configuration, corresponding to the supported interface standards, are attached. The cables connect the appropriate drivers and receivers of the DTE with the corresponding receivers and drivers, respectively, of the DCE. Additionally the cables also contain termination devices and a selection mechanism to select which drivers and receivers are to be used by the DTE to communicate with the receivers and drivers, respectively, being used by the DCE.

18 Claims, 7 Drawing Sheets

SERIAL COMMUNICATIONS INTERFACE THAT SUPPORTS MULTIPLE INTERFACE STANDARDS

This application is a continuation of application Ser. No. 08/198,448, filed Feb. 18, 1994, now U.S. Pat. No. 5,737,364.

FIELD OF THE INVENTION

This invention relates generally to a digital interface apparatus for serial communication between data-terminal-equipment (DTE) and data-communications equipment (DCE) and more specifically to a digital interface apparatus for interfacing a DTE to a DCE employing any one of a number of communications interface standards.

BACKGROUND OF THE INVENTION

Both the Electronic Industries Association (EIA) and the International Telegraph and Telephone Consultative Committee (CCITT, also called ITU) have established engineering standards to facilitate the interconnection of equipment used for the serial transmission of digital data. These standards specify mechanical characteristics, electrical characteristics, and protocols for digital data exchange. There are many different standards used to interconnect DTEs and DCEs. Some of these standards are used worldwide while others are regional.

The standards discussed herein can be divided into two general classes of communications interfaces: single-ended, unbalanced, common return digital interfaces, and balanced, differential digital interfaces. The EIA RS-232 standard specifies a single-ended, unbalanced interface generally limited to transmission rates of up to 20,000 bits per second over a 50 foot cable. The EIA RS-449 standard and CCITT standard X.21 provide a balanced differential interface that is capable of transmission rates of up to 10,000,000 bits per second over a 25 foot cable. The CCITT V.35 standard is an older type of interface that uses a mixture of balanced, differential signals and single-ended unbalanced signals, and is limited to transmission rates of up to 64,000 bits per second over a 50 foot cable.

With the multiplicity of interface standards in use it is difficult to design DTEs that will interconnect with the wide range of available DCEs. Most existing DTE interconnection devices Support a single type of interface. Typically, different interface standards are accommodated by requiring the user to interchange internal circuit boards or components.

Several attempts have been made to develop a DTE interface that will support multiple standards. However these DTE interfaces require the user to switch internal circuit connections or add adapter circuit modules to accommodate to a different interface standard. An example of this type of interface is described in the Sealevel Systems Model 4013 Communications Board Functional Specification and User Manual (Sealevel Systems, Liberty, N.C.).

One DTE board supporting multiple standards is disclosed in U.S. Pat. No. 4,403,111 (the '111 patent) to Kelly. This patent discloses a DTE interface that permits the DTE to provide the EIA RS-232 interface, the EIA RS-449 interface, and a proprietary interface, which is a derivative of the EIA RS-449 standard, using only a single 25 pin connector. However, the DTE interface disclosed in the '111 patent omitted some critical signals and hence did not fully implement the applicable standards. In addition this device failed to present the required termination impedance to the connected DCE. Further the DTE interface disclosed in the '111 patent was not capable of accommodating more than 2 different communications standards due to pin limitations in the interface connector.

The present invention relates to a DTE interface is desired that will interconnect with a range of different DCE's using different interface standards, without requiring that the user take special actions to permit the interface to properly function.

SUMMARY OF THE INVENTION

The invention relates to a communications interface for connecting data-terminal-equipment (DTE) to a range of data-communication-equipment (DCE) using a multiplicity of interface standards. The DTE interface includes a panel connector, a plurality of line drivers and receivers and associated electronics to select which of the plurality of receivers and drivers are to be used by the DTE in communicating with the DCE using the proper interface standard. The selection is made by connecting a cable, which has an identification mechanism corresponding to the supported interface standard, to the DTE panel connector.

The cable connects the correct drivers and receivers of the DTE with the corresponding receivers and drivers, respectively, of the DCE according to the applicable standard and also provides line termination devices as required by the applicable standard.

BRIEF DESCRIPTION OF THE DRAWING

This invention is pointed out with particularity in the appended claims. The above and further advantages of this invention may be better understood by referring to the following description taken in conjunction with the accompanying drawing, in which:

DETAILED DESCRIPTION OF THE PREFERRED EMBODIMENT

Figure 1:
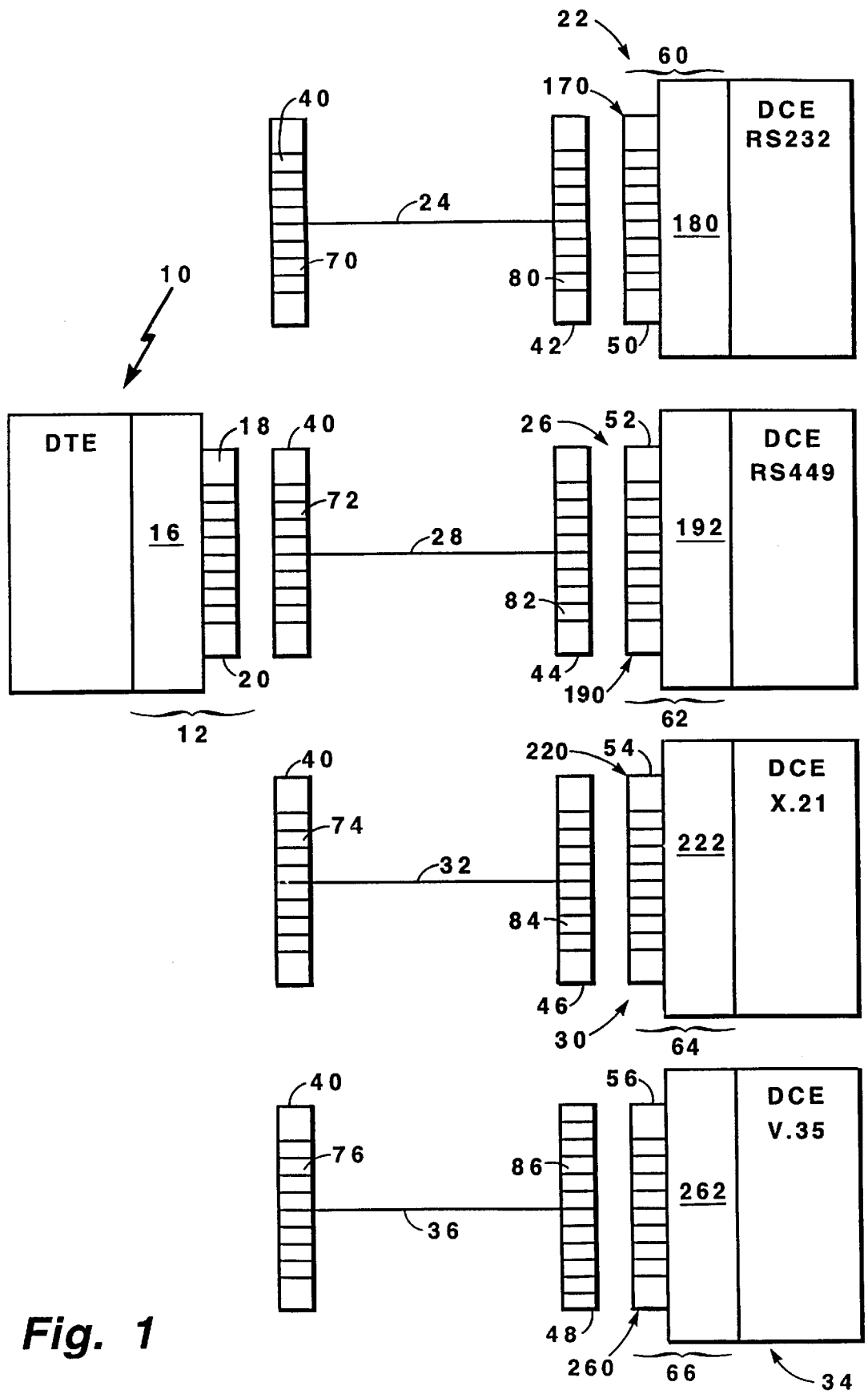
FIG. 1 shows a block diagram of an embodiment of a system using the presently disclosed interface to connect a DTE to different types of DCE devices using different interface standards.

In brief overview, FIG. 1 is a block diagram of an embodiment of a DTE 10 having a DTE interface apparatus 12 and cable to communicate with a DCE 22, 26, 30, 34 using any one of a number of predetermined communications protocols. The DTE interface apparatus 12 includes interface electronics 16 in electrical communication with the contacts 18 of a single DTE mechanical connector 20. In the illustrative embodiment, the DTE interface apparatus 12 is capable of being connected to DCEs 22, 26, 30, 34 utilizing four different interface standards: an EIA RS-232 standard device 22 using cable assembly 24, EIA RS-449 standard device 26 using cable assembly 28, CCITT X.21 standard device 30 using cable assembly 32, and CCITT V.35 standard device 34 using cable assembly 36.

All four cable assemblies 24, 28, 32 and 36 incorporate a twenty five pin mechanical connector 40 on one end to mate with the twenty five pin panel connector 20 of the DTE interface apparatus 12. Each cable 24, 28, 32, 36 includes an appropriate standard defined connector 42, 44, 46, 48 on its other end to mate with the panel connector 50, 52, 54, 56 of the respective DCE interface 60, 62, 64, 66 of the respective DCE 22, 26, 30, 34. Each cable assembly 24, 28, 32, 36 is wired so as to connect the appropriate contacts 70, 72, 74, 76 of the twenty five pin mechanical connector 40 of the DTE side of the cable to the corresponding contacts 80, 82, 84, 86 of the appropriate standard defined connector 42, 44, 46, 48 of the DCE side of the cable.

Figure 2:
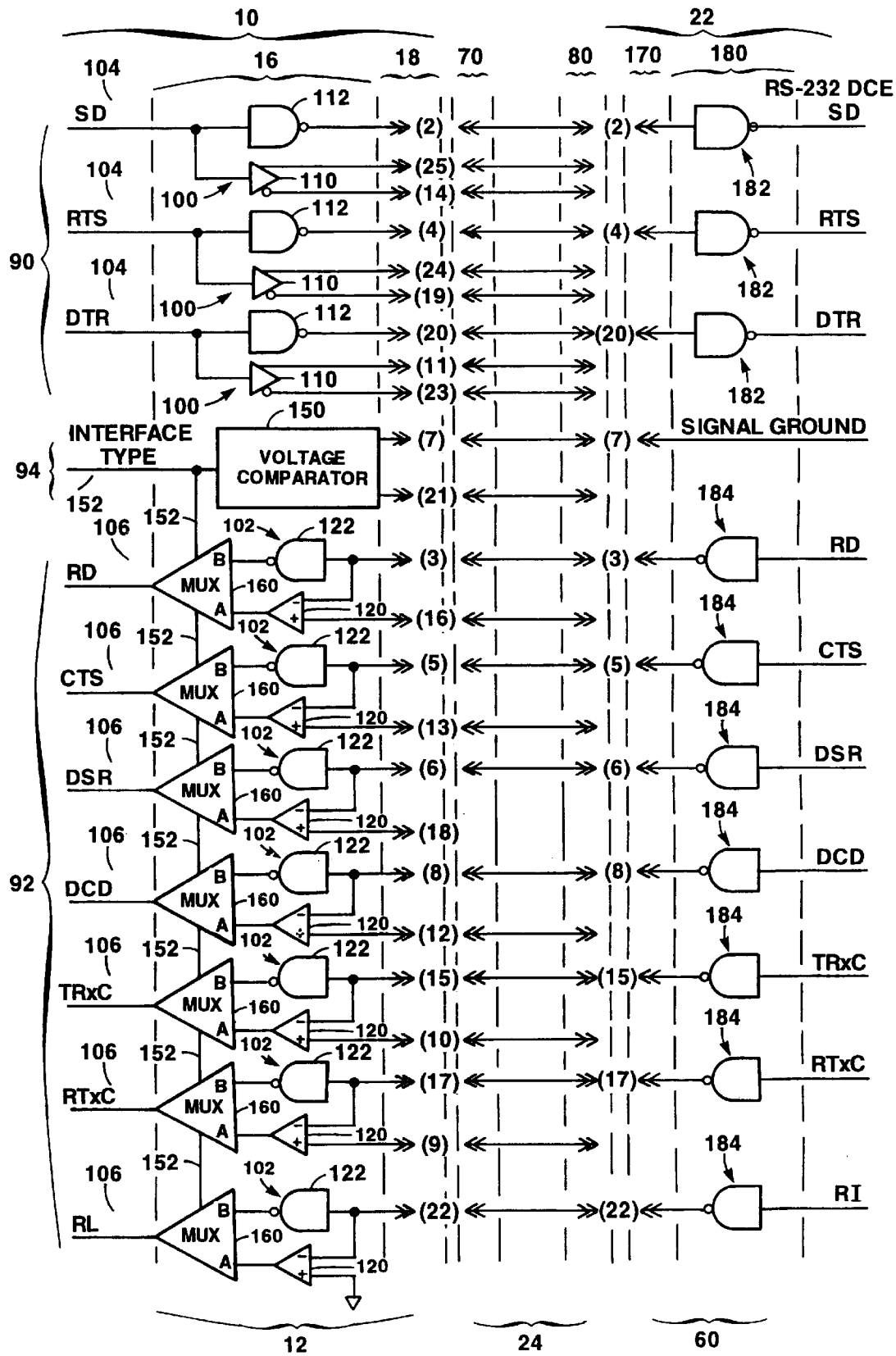
FIG. 2 shows an embodiment of the presently disclosed interface using the default EIA standard RS-232 interface and cable.

Considering the DTE interface 12 in more detail, FIG. 2 depicts an embodiment of the signal drivers 90, receivers 92, and selection circuitry 94 used by the DTE interface electronics 16. A pair of drivers 100 and a pair of receivers 102 is shown for each signal 104 transmitted by or each signal 106 received by the DTE 10. Each output signal 104 from the DTE 10 is an input signal to a differential driver 110 and a single-ended driver 112 which drive different contacts 18 in the panel connector 20. Each input signal 106 to the DTE 10 is received from one of a pair of receivers 102. A signal received from the DCE 22 is an input signal to a differential input pair of a balanced differential receiver 120. The negative side of the input pair also is an input signal to a single-ended receiver 122. Both the drivers and receivers will be explained in further detail below.

The DTE interface electronics 16 also includes a voltage comparator circuit 150 the output of which is a coded binary signal on a multiwire bus 152 in electrical communication to a plurality of output multiplexers (MUX) 160. The coded binary signal is also provided to the DTE 10. Each of the output multiplexers 160 is used to select which of single ended receivers 122 or balanced differential receivers 120 will be used to transmit the received signals 106 to the DTE 10. The comparator circuit 150 will be explained in detail below.

FIG. 2 further depicts the interconnection of the embodiment of the DTE interface 12 to a representative EIA RS-232 standard DCE 22. The DTE interface 12 using the contacts 18 for the panel connector 20 is coupled to a twenty five conductor cable assembly 24 via mating connector 40 having contacts 70. The contact assignments for contacts 70 correspond to the contact assignments for contacts 18. The contact assignments for contacts 70 of the mechanical connector 40 are shown with corresponding numbers for the contact assignments for contacts 18 of the panel connector 20 indicated in parenthesis ( ).

The other end of the twenty five conductor cable assembly 24 includes a twenty five contact mechanical connector 42 having contacts 80. The contact assignments for contacts 80 correspond to the contact assignments for contacts 170 of the panel connector 50 of the DCE interface 60. The DCE interface 60 is a standard RS-232 interface and is shown with corresponding numbers for the contact assignments for contacts 170 of the panel connector 50 indicated in parenthesis ( ). These contact assignments insure the appropriate connection of the drivers 100 and receivers 102 of the DTE interface electronics 16 to the receivers 182 and drivers 184 of the DCE RS-232 interface electronics 180.

The cable assembly 24 contains no electrical termination components. The "interface selection" contact of the DTE interface 12 in position (21) of the contacts 18 has no connection and thus supplies no load impedance to the DTE interface electronics 16. This is interpreted by the voltage comparator 150 as selecting the single-ended drivers 112 and receivers 122. This type of cable assembly 24 is an RS-232 standard cable that is readily available from many vendors. Since no impedance corresponds to the selection of the RS-232 protocol and since this will result from using an RS-232 cable, the RS-232 is the default interface. The DTE interface electronics 16 implements an EIA RS-232 standard primary synchronous/asynchronous serial communications channel when the default interface is selected.

Figure 3:
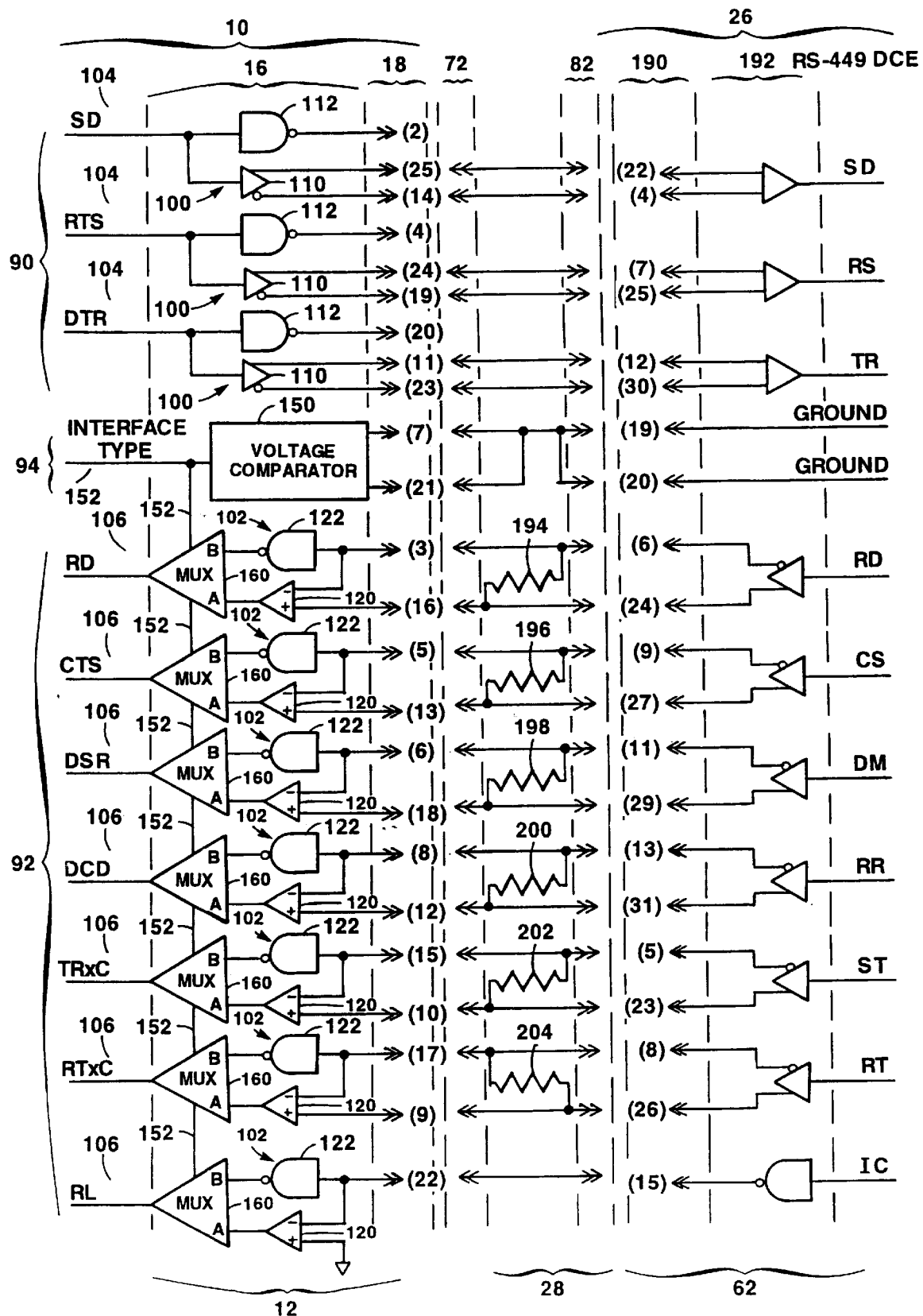
FIG. 3 shows an embodiment of the presently disclosed interface using the EIA standard RS-449 interface and cable.

FIG. 3 shows an embodiment of the interconnection of the present invention to an EIA RS-449 standard interface DCE 26. The DTE interface 12 utilizes the same configuration of interface electronics 16 and contact assignments for contacts 18 of the panel connector 20 as described with respect to FIG. 2. The panel connector 20 is coupled to a twenty five conductor cable assembly 28 with the wiring depicted. The contact assignments for contacts 72 of the mechanical connector 40 are shown with corresponding numbers for the contact assignments for contacts 18 of the panel connector 20 indicated in parenthesis ( ).

The other end of the twenty five conductor cable assembly 28 is connected to a thirty seven contact mechanical connector 44 having contact assignments for contacts 82 which correspond to the contact assignments for contacts 190. of the panel connector 52 of the DCE interface 62. The DCE interface 62 is an RS-449 standard interface and is shown with corresponding numbers for the contact assignments for contacts 190 of the panel connector 52 indicated in parenthesis ( ). These contact assignments provide the appropriate connection to the receivers and drivers of the DCE RS-449 interface electronics 192.

The cable assembly 28 contains six termination resistors 194, 196, 198, 200, 202, 204 each having a value of one hundred twenty ohms, as required by the RS-449 standard. The "interface selection" contact of the DTE interface 12 in position (21) of the contacts 18 is connected to signal ground at position (7) of the contacts 18. This presents a very low load impedance to the voltage comparator 150 of the DTE interface electronics 16. The voltage comparator 150, in response to the low impedance, selects the differential drivers 110 and receivers 120 to send signals from and receive signals to the DTE 10 and identifies this as an RS-449 interconnect.

Figure 4:
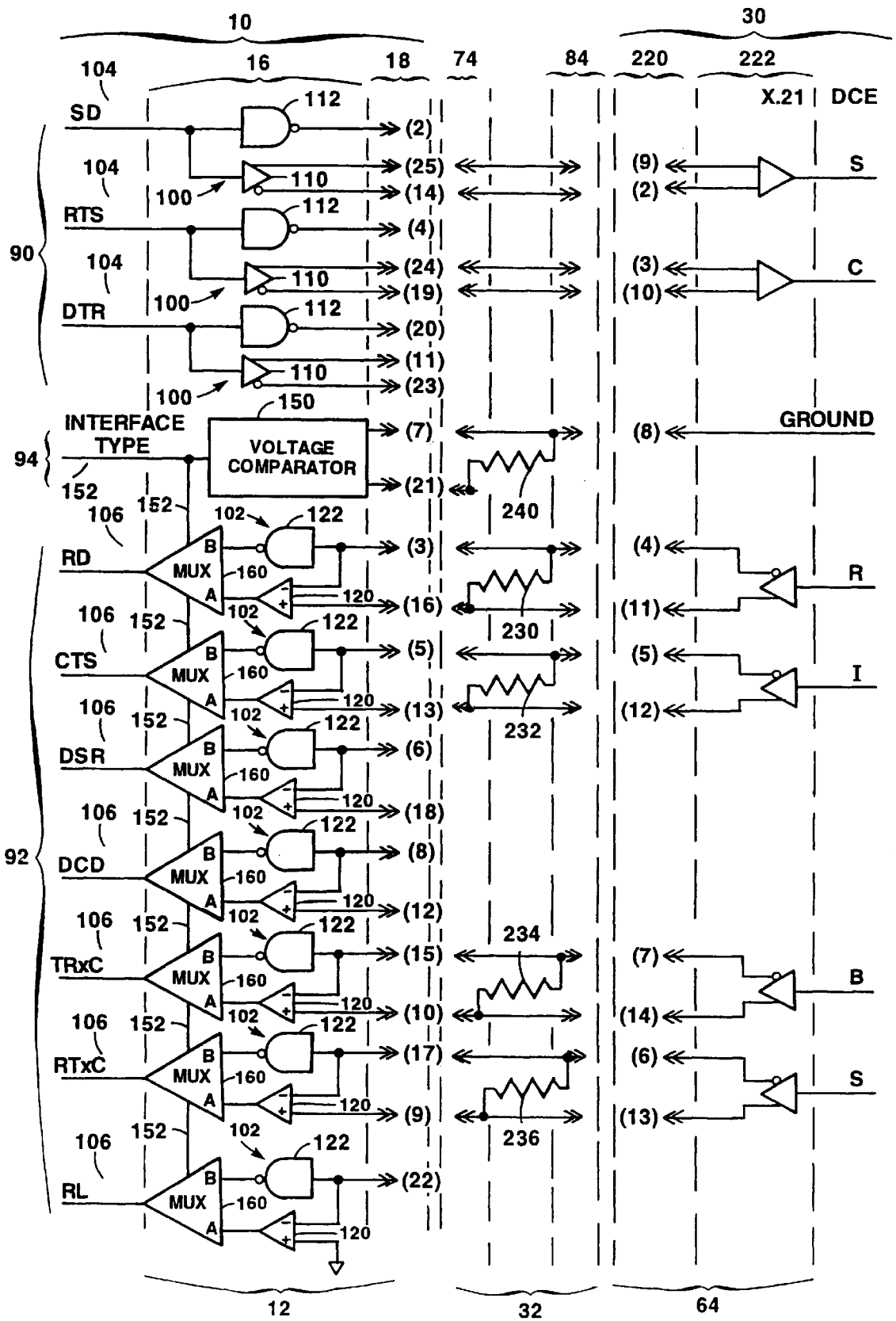
FIG. 4 shows an embodiment of the presently disclosed interface using the CCITT standard X.21 interface and cable.

FIG. 4 shows an embodiment of the interconnection of the present invention to a CCITT X.21 standard interface DCE 30. Again, the DTE interface 12 utilizes the same configuration of interface electronics 16 and contact assignments for contacts 18 of the panel connector 20 as described with respect to FIG. 2. The panel connector 20 is coupled to a thirteen conductor cable assembly 32 with the wiring depicted. The contact assignments for contacts 74 of the mechanical connector 40 are shown with corresponding numbers for the contact assignments for contacts 18 of the panel connector 20 indicated in parenthesis ( ).

The other end of the thirteen conductor cable assembly 32 is connected to a fifteen contact mechanical connector 46 which has contact assignments for contacts 84 which correspond to the contact assignments for contacts 220 of the panel connector 54 of the DCE interface 64. The DCE interface 64 is a CCITT X.21 standard interface and is shown with corresponding numbers for the contact assignments for contacts 220 of the panel connector 54 indicated in parenthesis ( ). This contact 220 assignments provide the appropriate connection between the receivers and drivers of DTE interface electronics 16 and the DCE X.21 interface electronics 222.

The cable assembly 32 contains four termination resistors 230, 232, 234, 236 each having a value of one hundred and twenty ohms, as required by the X.21 standard. The "interface selection" contact of the DTE interface 12 in position (21) of the contacts 18 is connected to signal ground at position (7) of the contacts 18 through a 667 ohm resistive load 240. In response to this value of resistive load, the voltage comparator 150 of the DTE interface electronics 16 selects the differential drivers 110 and receivers 120 to send signals from and receive signals to the DTE 10 and identifies this as an X.21 interconnect.

Figure 5:
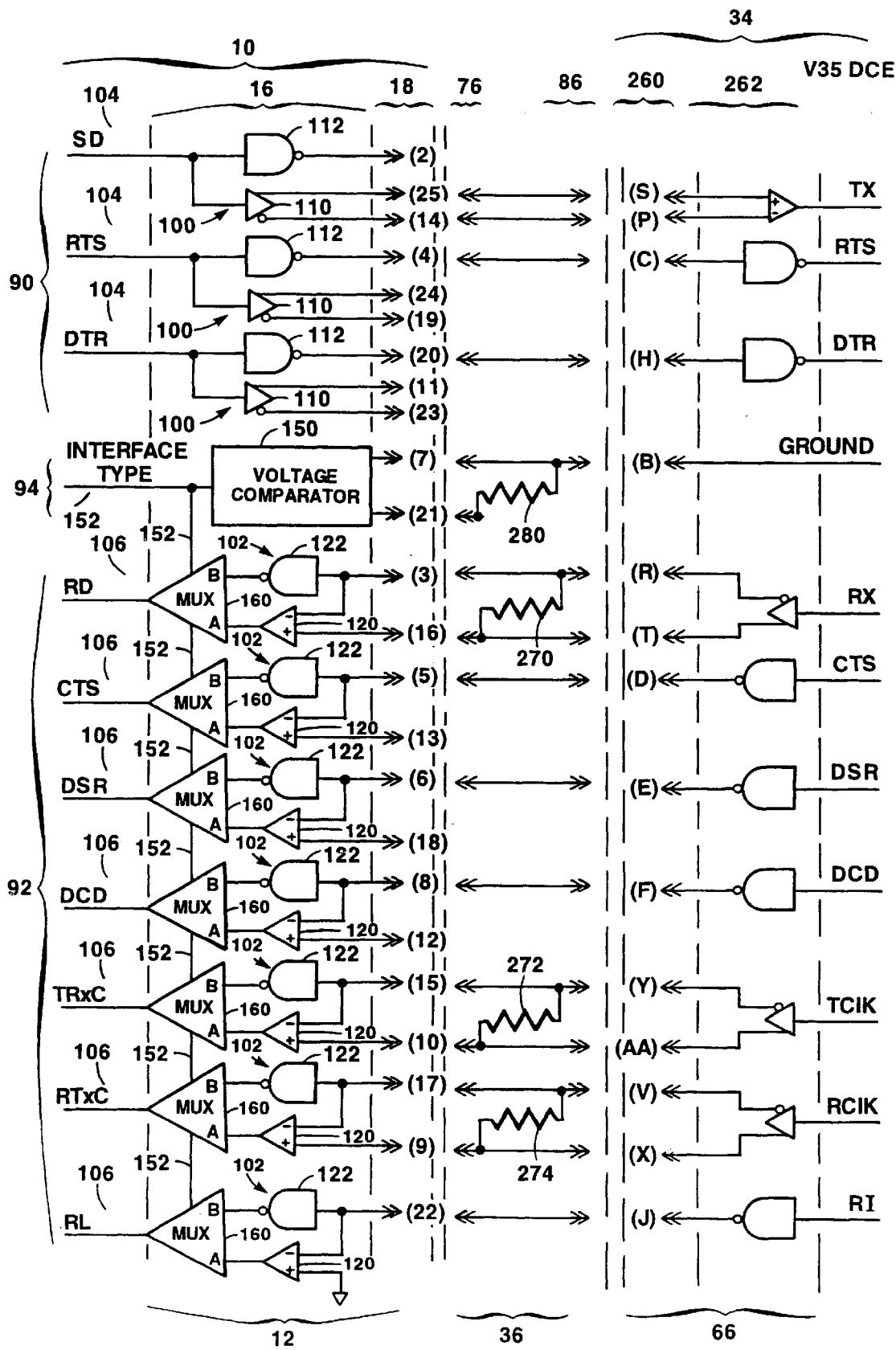
FIG. 5 shows an embodiment of the presently disclosed interface using the CCITT standard V.35 interface and cable.

FIG. 5 shows an embodiment of the interconnection of the present invention to a CCITT V.35 standard interface DCE 34. Again, the DTE interface 12 utilizes the same configuration of interface electronics 16 and contact assignments for contacts 18 of the panel connector 20 as described with respect to FIG. 2. The panel connector 20 is coupled to a fifteen conductor cable assembly 36 with the wiring depicted. The contact assignments for contacts 76 of the mechanical connector 40 are shown with corresponding numbers for the contact assignments for contacts 18 of the panel connector 20 indicated in parenthesis ( ).

The other end of the fifteen conductor cable assembly 36 is connected to a thirty five contact mechanical connector 48 which has contact assignments for contacts 86 which correspond to the contact assignments for contacts 260 of the panel connector 56 of the DCE interface 66. The DCE interface 66 is a standard CCITT V.35 interface and is shown with corresponding letters for the contact assignments for contacts 260 of the panel connector 56 indicated in parenthesis ( ). These contact assignments provide the appropriate connection between the drivers and receivers of the DTE interface 16 and the receivers and drivers of the DCE V.35 interface electronics 262.

The cable assembly 36 contains three termination resistors 270, 272, 274 each having a value of one hundred and twenty ohms, as required by the V.35 standard. The "interface selection" contact of the DTE interface 12 in position (21) of the contacts 18 is connected to signal ground at position (7) of the contacts 18 through a 1500 ohm resistive load 280. In response to this high value of resistive load, the voltage comparator 150 of the DTE interface electronics 16 selects the differential drivers 110 and receivers 120 to send and receive signals to the DTE 10 and identifies this as an V.35 interconnect.

The exact designation and usage assignment of each contact 18 within the twenty five position DTE panel connector 20 is given in Table 1. The signal names given in Table 1 are the common usage names for these signals as given in the standards specification for each DCE interface. Unused contacts for a particular interface standard are marked "Unused". The method for sharing positions within the twenty five contact panel connector 20 can readily be seen from Table 1.

Figure 6:
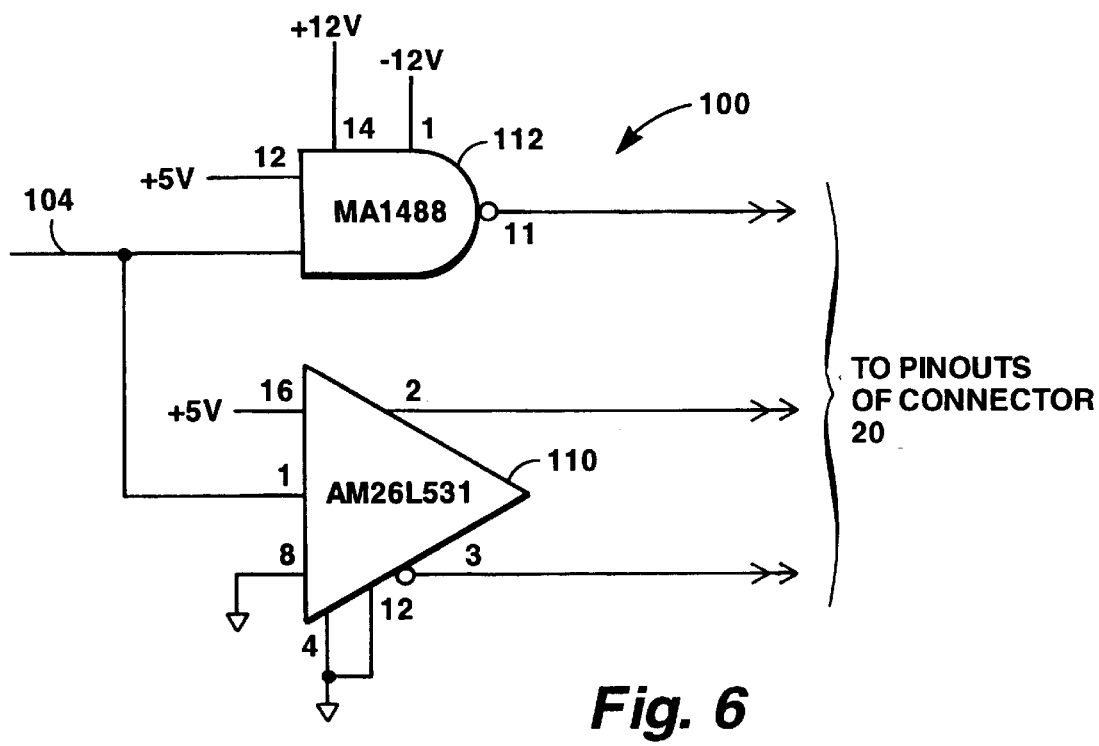
FIG. 6 shows a schematic diagram of an embodiment of a DTE driver pair used in the presently disclosed interface.

FIG. 6 shows an embodiment of a signal driver pair 100 for one output signal from a DTE 10. This circuitry is repeated for all output signals of the DTE 10. In this embodiment, the single-ended driver 112 is a Motorola MC1488 Quad Line driver, while the differential driver 110 is a Motorola AM26LS31 Differential Quad Line driver. The TTL signal 104 from the DTE 10 is the input signal to both line drivers 110, 112. The VCC+ input of the single ended driver 112 (pin 14) is connected to a +12 volt supply and the VCC-input (pin 1) is connected to a −12 volt supply. The VCC input of the differential driver 110 (pin 16) is connected to a +5 volt supply and the GND input (pin 8) is connected to ground. The enable inputs (pins 4 and 12) of the differential driver 110 are also connected to ground. The output signals from both drivers 110, 112 are transmitted to the DCE through the appropriate contacts 18 of the twenty five contact panel connector 20 as shown in FIGS. 2–5.

Figure 7:
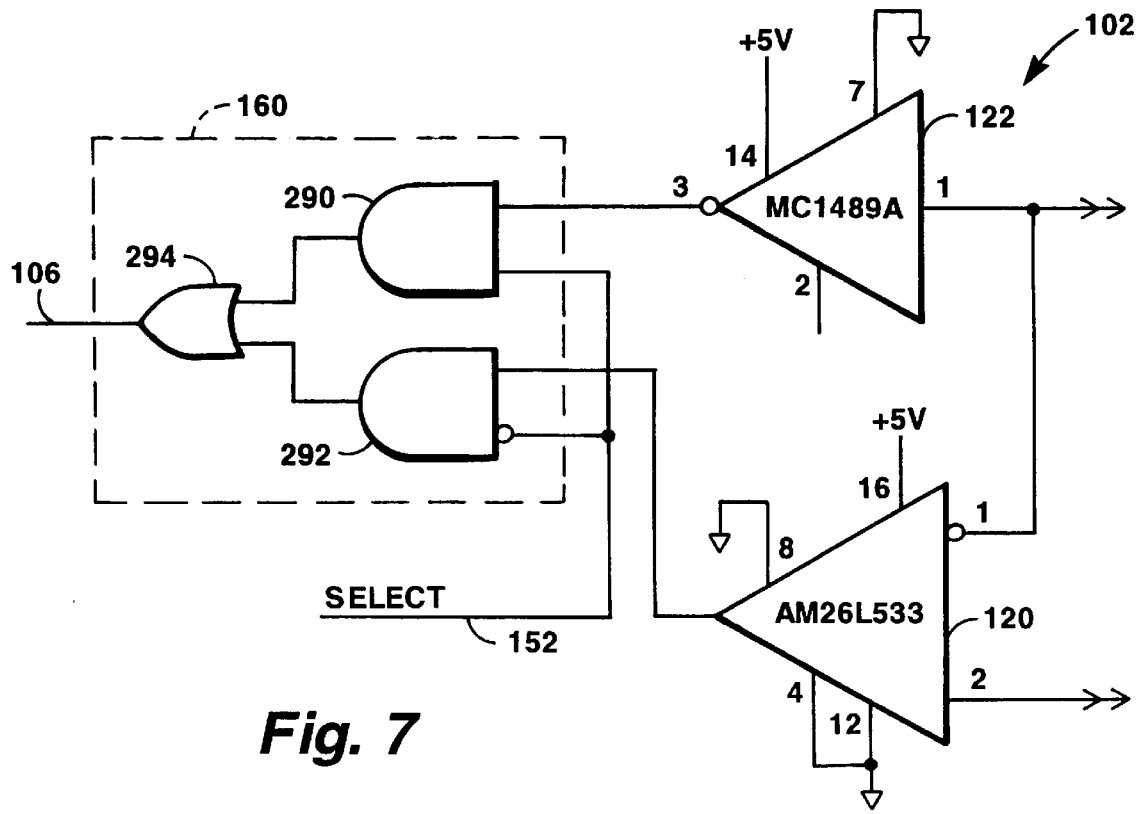
FIG. 7 shows a schematic diagram of an embodiment of a receiver used in the presently disclosed interface.

FIG. 7 shows an embodiment of a signal receiver pair 102 and multiplexer 160 for one input signal to DTE 10. This circuitry is repeated for all inputs of the DTE 10. The single-ended receiver 122 of the receiver pair 102 is the Motorola MC1489A Quad Line Receiver, while the differential receiver 120 is the Motorola AM26LS33 Differential Quad Line Receiver. The differential input signal pair from panel connector 20 is the positive input signal to the receiver 120 (pin 2), with the negative input signal as applied to (pin 1) also sent to the input (pin 1) of the single ended receiver 122. The VCC input of the single-ended receiver 122 (pin 14) is connected to the +5 volt supply and the GND input (pin 7) is connected to ground. The VCC input of the differential receiver 120 (pin 16) is connected to the +5 volt supply and the GND input (pin 8) is connected to ground. The enable inputs (pins 4 and 12) of the differential receiver 120 are also connected to ground.

The output from each receiver 120, 122 is an input to a 2-1 multiplexer 160 implemented with programmable array logic (PAL). An embodiment of the multiplexer using two symbolic AND logic functions 290, 292 and one symbolic OR logic function 294 is depicted. The multiplexer 160 select input is supplied as a coded binary input from the voltage comparator 150 by a multiwire bus 152 as discussed below.

Figure 8:
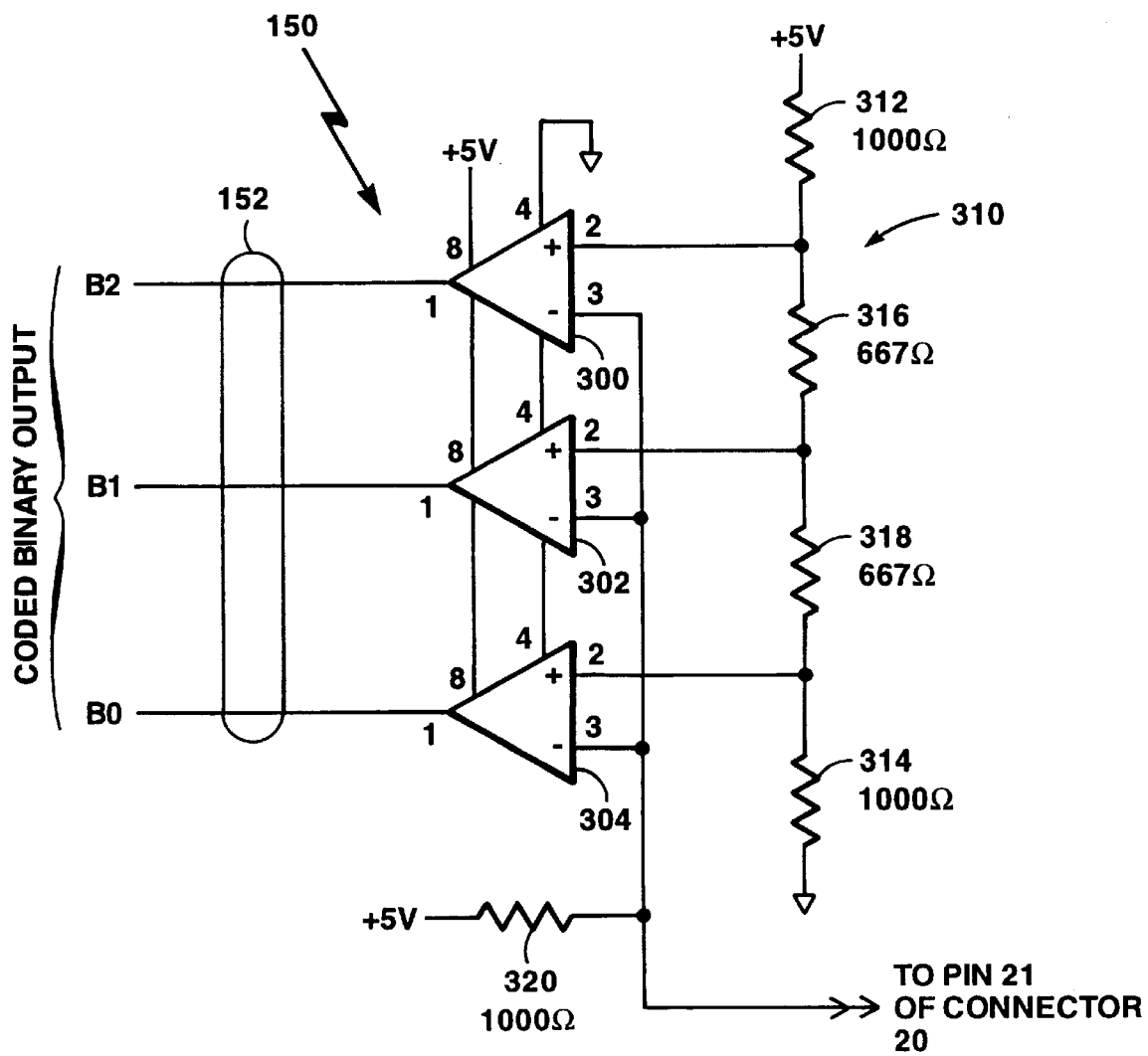
FIG. 8 shows a schematic diagram of an embodiment of a voltage comparator of the presently disclosed interface used to determine the interface type.

FIG. 8 shows an embodiment of the voltage comparator 150 used in the interface. The voltage comparator 150 receives its input from (pin 21) of the panel connector 20. This embodiment of voltage comparator 150 uses three Motorola LM111N integrated circuit voltage comparators 300, 302 and 304. The VCC+ input (pin 8) of each comparator 300, 302 and 304 is connected to the +5 voltage supply, while the VCC− input (pin 4) is connected to ground.

A voltage divider network 310 is composed of two resistors of value 1000 ohms 312, 314 and two 667 ohm resistors 316, 318 connected in series between a +5 volt supply and ground. The positive input terminals (pin 2) of each of the comparators 300, 302, 304 are connected to the nodes of the divider network 310 as shown. This configuration establishes a reference voltage of 3.5V at (pin 2) of comparator 300, a reference voltage of 2.5V at (pin 2) of comparator 302, and a reference voltage of 1.5V at (pin 2) of comparator 304. The negative input terminals (pin 3) of all three comparators 300, 302, 304 are directly connected to the interface selection contact, (pin 21), of the twenty five pin panel connector 20, and to one terminal of 1000 ohm resistor 320. The other terminal of resistor 320 is connected to the +5 voltage supply.

The value of the load resistors 240 and 280 in cables 32 and 36 which are connected between contact 21 and contact 7 of panel connector 20 when cables 32 and 36 are attached creates a second voltage divider that supplies an input voltage to the negative side (pin 3) of the comparators 300, 302 and 304. Table 2 shows the resistive load in the cable, the select voltage, and the binary output for each of the four interface types.

The voltage comparator 150 generates a coded binary output (B0, B1, B2) on a multiwire bus 152 that specifies type of DCE device currently interconnected with the DTE 10. Column 4 in table 2 specifies the binary output for each interface type. This binary output is decoded by the PAL implementation of the 2-1 multiplexer 160 on each DTE input signal 106 to select the proper receiver type (single ended 122 or differential 120) required for a particular interface standard. Table 3 shows the type of receiver selected for each of the four interface types.

Although the invention has been explained with reference to a number of standard interfaces, the invention may be constructed with additional signal generators and receivers and different cable designs to implement a DTE to DCE interconnect for another type of standard, e.g. EIA standard EIA-530, or EIA standard EIA-485. A different implementation could also use different pin assignments within the DTE mechanical connector, or different sharing of signal wires without altering the fundamental innovation discussed above. It is also possible, by using a DTE connector with a larger number of pins, to associate combinations of non-signal pins with various interface standards.

Having shown the preferred embodiment, those skilled in the art will realize many variations are possible which will still be within the scope and spirit of the claimed invention. Therefore, it is the intention to limit the invention only as indicated by the scope of the following claims.

What is claimed is:

1. A communications system for supporting a plurality of communications standards between DTE and DCE, said communications system comprising:
    a DTE interface, said DTE interface comprising:
        a first connector;
        first and second receivers, said first and second receivers each having at least one input terminal in electrical communication with said first connector, said first and second receivers each having an output terminal; and
        a selection circuit having at least one control terminal in electrical communication with said first connector, an output terminal in electrical communication with DTE, a first input terminal in electrical communication with said output terminal of said first receiver, and a second input terminal in electrical communication with said output terminal of said second receiver; and
    a DTE interface cable assembly, said DTE interface cable assembly comprising a second connector for mating with said first connector, said DTE interface cable assembly also comprising an identification device in electrical communication with said second connector,
    said identification device operative to provide at least one respective signal to said at least one control terminal through said first and second connectors for identifying which of said plurality of communications standards is supported by said DTE interface cable assembly,
    said selection circuit operative to electrically connect the output terminal of either said first receiver or said second receiver to said output terminal of said selection circuit in response to said at least one respective signal provided to said at least one control terminal.

2. The communications system as defined in claim 1, wherein said first receiver is a balanced differential receiver and said second receiver is a single-ended receiver.

3. The communications system as defined in claim 1, wherein said selection circuit comprises a multiplexer.

4. The communications system as defined in claim 1, wherein said selection circuit comprises a voltage comparator.

5. The communications system as defined in claim 1, wherein said identification device comprises a resistor in electrical communication with said second connector.

6. The communications system as defined in claim 1, wherein said identification device comprises a wire in electrical communication with said second connector.

7. A communications interface for supporting a plurality of communications standards between DTE and DCE, said communications interface comprising:
    a connector;
    interface electronics comprising first and second receivers, said first and second receivers each having an output terminal, said first and second receivers each having at least one input terminal in electrical communication with said connector; and
    a selection circuit having at least one control terminal in electrical communication with said connector, an output terminal in electrical communication with DTE, a first input terminal in electrical communication with said output terminal of said first receiver, and a second input terminal in electrical communication with said output terminal of said second receiver;
    said selection circuit operative to electrically connect the output terminal of either said first receiver or said second receiver to said output terminal of said selection circuit in response to at least one respective signal applied to said at least one control terminal.

8. The communications interface as defined in claim 7, wherein said first receiver is a balanced differential receiver and said second receiver is a single-ended receiver.

9. The communications interface as defined in claim 7, wherein said selection circuit comprises a multiplexer.

10. The communications interface as defined in claim 7, wherein said selection circuit comprises a voltage comparator.

11. The communications interface as defined in claim 7, wherein said identification device comprises a resistor in electrical communication with said second connector.

12. The communications interface as defined in claim 7, wherein said identification device comprises a wire in electrical communication with said second connector.

13. A cable assembly for supporting a plurality of communications standards between DTE and DCE, said cable assembly comprising:
    a cable connector for mating with a panel connector of a DTE interface; and
    an identification device in electrical communication with said cable connector,
    said identification device operative to provide at least one signal to identify which of a plurality of communications standards is supported by said cable assembly, said identification device providing said at least one signal to at least one respective control terminal of a selection circuit of said DTE interface through said cable connector and said panel connector,
    said selection circuit comprising an output terminal in electrical communication with DTE, a first input terminal in electrical communication with an output terminal of a first receiver of said DTE interface, and a second input terminal in electrical communication with an output terminal of a second receiver of said DTE interface;

said selection circuit operative to electrically connect the output of either said first receiver or said second receiver to the output of said selection circuit in response to said at least one signal provided to said at least one respective control terminal.

14. The cable assembly as defined in claim 13, wherein said first receiver is a balanced differential receiver and said second receiver is a single-ended receiver.

15. The cable assembly as defined in claim 13, wherein said selection circuit comprises a multiplexer.

16. The cable assembly as defined in claim 13, wherein said selection circuit comprises a voltage comparator.

17. The cable assembly as defined in claim 13, wherein said identification device comprises a resistor in electrical communication with said cable connector.

18. The cable assembly as defined in claim 13, wherein said identification device comprises a wire in electrical communication with said cable connector.

* * * * *